(12) United States Patent
Escamilla

(10) Patent No.: US 11,954,561 B2
(45) Date of Patent: Apr. 9, 2024

(54) SYSTEM AND METHOD OF EXCHANGING INFORMATION THROUGH A WIRELESS BRAIN-COMPUTER INTERFACE

(71) Applicant: Joseph Robert Escamilla, San Antonio, TX (US)

(72) Inventor: Joseph Robert Escamilla, San Antonio, TX (US)

( * ) Notice: Subject to any disclaimer, the term of this patent is extended or adjusted under 35 U.S.C. 154(b) by 815 days.

(21) Appl. No.: 17/099,574

(22) Filed: Nov. 16, 2020

(65) Prior Publication Data
US 2022/0156623 A1    May 19, 2022

(51) Int. Cl.
| | | |
|---|---|---|
| *G06N 10/00* | (2022.01) | |
| *G06F 3/01* | (2006.01) | |
| *G06F 17/16* | (2006.01) | |

(52) U.S. Cl.
CPC ............ *G06N 10/00* (2019.01); *G06F 3/015* (2013.01); *G06F 17/16* (2013.01)

(58) Field of Classification Search
CPC .......... G06N 10/00; G06N 3/061; G06N 3/08; G06N 10/40; G06F 3/015; G06F 17/16
See application file for complete search history.

(56) References Cited

U.S. PATENT DOCUMENTS

| | | | |
|---|---|---|---|
| 7,145,606 B2 | 12/2006 | Haisma et al. | |
| 8,655,152 B2 | 2/2014 | Marks et al. | |
| 10,403,251 B1 | 9/2019 | Escamilla | |
| 2003/0085901 A1 | 5/2003 | Peleg et al. | |
| 2007/0203655 A1* | 8/2007 | Hu | A61N 2/02 702/22 |
| 2012/0253168 A1* | 10/2012 | Hu | G06N 10/00 600/409 |
| 2020/0410380 A1* | 12/2020 | Phan | G06F 18/23213 |
| 2022/0023656 A1* | 1/2022 | Hu | B82Y 10/00 |
| 2023/0125806 A1* | 4/2023 | Klouzal | G06F 3/015 700/83 |

FOREIGN PATENT DOCUMENTS

| | | | | |
|---|---|---|---|---|
| CN | 112819166 A | * | 5/2021 | |
| CN | 113051813 A | * | 6/2021 | |
| CN | 114341767 A | * | 4/2022 | ............... F25B 9/12 |
| CN | 115136156 A | * | 9/2022 | ............. G06N 10/00 |
| JP | 2022511293 A | * | 9/2019 | ............. G06F 30/30 |

OTHER PUBLICATIONS

Cauduro, Live Deep Fakes, Apr. 4, 2018, medium.com.
Vincent, AI deepfakes are now as simple as typing whatever you want your subject to say, Jun. 10, 2019, theverge.com.

* cited by examiner

*Primary Examiner* — Hassan Mrabi

(57) ABSTRACT

A system used to implement the method of exchanging information through a wireless brain-computer interface includes a specified brain and a quantum supercomputer. The quantum supercomputer is initially used to detect a plurality of compositional particles within the specified brain. A quantum entanglement is then induced in between each compositional particle and the quantum supercomputer. The quantum supercomputer is subsequently used to generate an eigenmatrix of the specified brain with the quantum supercomputer, wherein the eigenmatrix is a representation of each compositional particle. The method concludes by enabling two-way communication between the specified brain and the quantum supercomputer by modifying the eigenmatrix.

10 Claims, 11 Drawing Sheets

SYSTEM AND METHOD OF EXCHANGING INFORMATION THROUGH A WIRELESS BRAIN-COMPUTER INTERFACE

FIELD OF THE INVENTION

The present invention generally relates to a brain-computer interface. More specifically, the present invention is implemented by taking advantage of some principles in quantum mechanics.

BACKGROUND OF THE INVENTION

A typical brain-computer interface does not allow effective and efficient communication between a human brain and a specific computer because the typical brain-computer interface does not implement the expanded bandwidth of communication provided by taking advantage of some quantum mechanical principles. The typical brain-computer interface operates under the principles of classical physics and consequently is not able to process every mental facet of the human brain.

Therefore, an objective of the present invention is to take advantage of some principles in quantum mechanics, such as quantum entanglement and logic based on qubits, in order to provide an improved interface between a computer and every mental facet of the human brain. This improved interface for the present invention allows for a more diversified set of interactions between a computer and the human brain. This improved interface for the present invention also allows for more nuanced communication between a computer and the human brain.

DETAILED DESCRIPTION OF THE INVENTION

All illustrations of the drawings are for the purpose of describing selected versions of the present invention and are not intended to limit the scope of the present invention.

Figure 1:
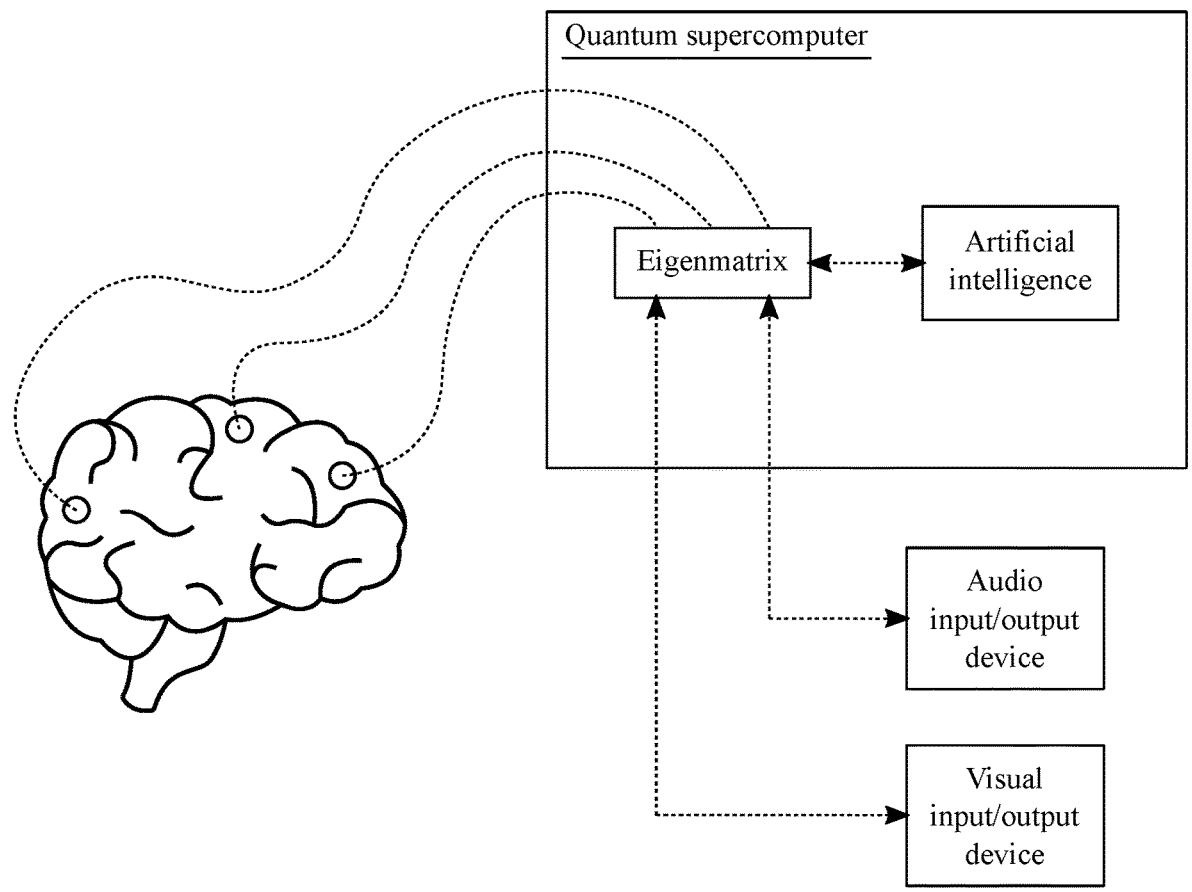
FIG. 1 is a diagram illustrating the system of the present invention.

The present invention is a system and method of exchanging information through a wireless brain-computer interface. The present invention is consequently used to enhance the computational ability and the information-storing ability of a human brain with quantum computing hardware. Thus, the system used to implement the method of the present invention is provided with a specified brain and a quantum supercomputer (Step A), which is shown in FIG. 1. The specified brain is the human brain that is readily available for enhancement by the quantum supercomputer. The quantum supercomputer is a computer that is capable of quantum computations at a high-performance capacity.

Figure 2:
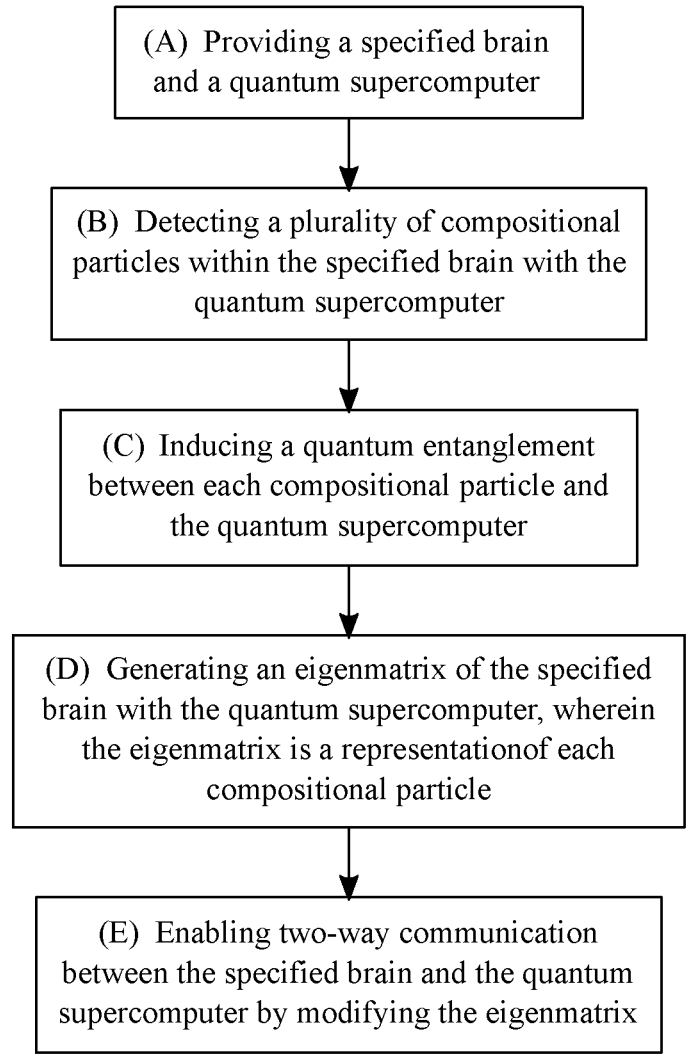
FIG. 2 is a flowchart illustrating an overall process for the method of the present invention.

As can be seen in FIG. 2, the method of the present invention follows an overall process in order to efficiently and effectively interface the specified brain to the quantum supercomputer. The overall process begins by detecting a plurality of compositional particles within the specified brain with the quantum supercomputer (Step B), which allows the quantum supercomputer to be computationally aware of each compositional particle. The plurality of compositional particles defines the atomic and/or subatomic makeup of the specified brain. The overall process continues by inducing a quantum entanglement between each compositional particle and the quantum supercomputer (Step C) so that the quantum supercomputer receives constant feedback of the current physical status of each compositional particle over a wireless offset distance. The quantum entanglement between each compositional particle and the quantum supercomputer is a shared quantum state between each compositional particle and at least one corresponding particle of the quantum supercomputer. The overall process continues by generating an eigenmatrix of the specified brain with the quantum supercomputer (Step D), which allows the quantum supercomputer to manage the eigenmatrix as a computational representation of each compositional particle. The overall process concludes by enabling two-way communication between the specific brain and the quantum supercomputer by modifying the eigenmatrix (Step E). Thus, if the quantum supercomputer generates an outgoing message to the specified brain, then the outgoing message is reflected as a modification to the eigenmatrix, which allows the specified brain to interpret the modification to the eigenmatrix as an incoming thought from the quantum supercomputer. Alternatively, if the specific brain has an outgoing thought to the quantum supercomputer as a change in the plurality of compositional particles, then the change is reflected as a modification to the eigenmatrix, which allows the quantum supercomputer to process the modification to the eigenmatrix as an incoming message from the specified brain.

Figure 3:
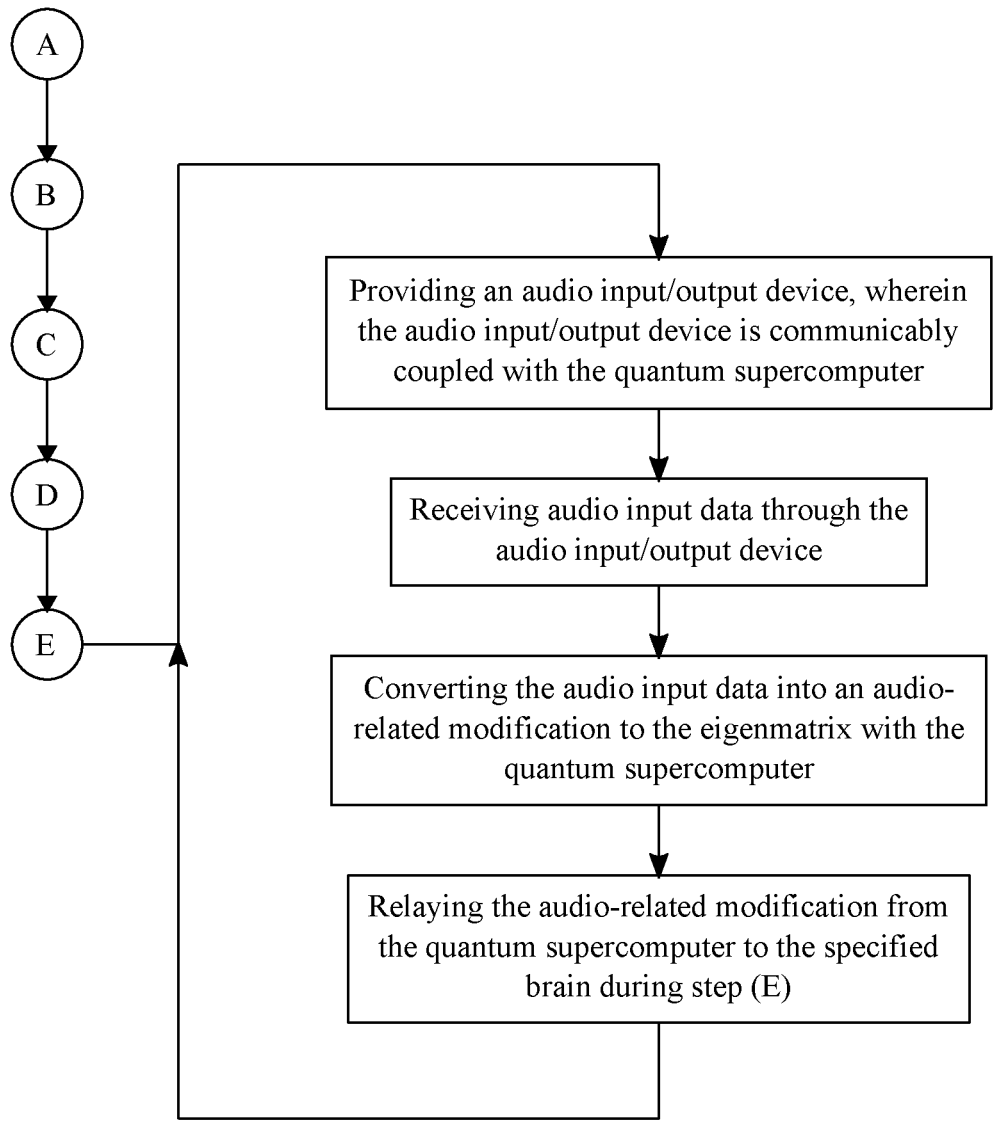
FIG. 3 is flowchart illustrating a subprocess of inputting audio material into a specified brain.
Figure 4:
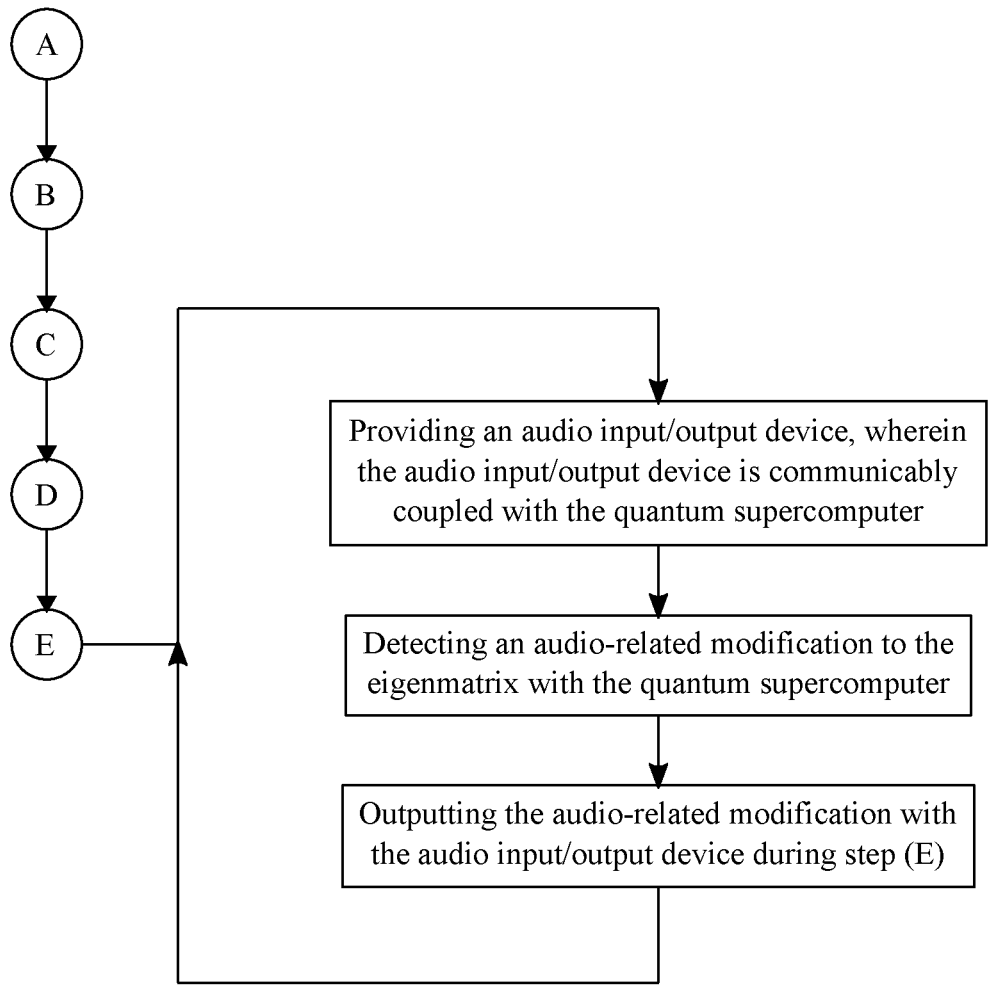
FIG. 4 is flowchart illustrating a subprocess of outputting audio material from a specified brain.

The quantum supercomputer can be used as a hub to exchange information between the specified brain and an audio input/output device. Moreover, the audio input/output device is capable of receiving or generating audible sounds and is communicably coupled with the quantum supercomputer. The audio input/output device can be, but is not limited to, a microphone, a speaker, an audio database, or combinations thereof. Thus, if the audio input/output device receives audio input data, then the quantum supercomputer can receive and process the audio input data. Subsequently, the quantum supercomputer converts the audio input data into an audio-related modification to the eigenmatrix so that the audio-related modification can be relayed as an incoming audio-related thought from the quantum supercomputer to the specified brain during Step E, which is shown in FIG. 3. For example, if the specified brain of a user has lost their physical ability to hear any audible sounds, then the audio input/output device and the quantum supercomputer can provide the user with an alternative means to hear an audible sound. Alternatively, if the specified brain generates an audio-related outgoing thought, then the audio-related outgoing thought is reflected as an audio-related modification to the eigenmatrix. Subsequently, the quantum supercomputer can detect, process, and relay the audio-related modification to the audio input/output device so that the audio input/output device can output and/or store the audio-related modification as an audible sound during Step E, which is shown in FIG. 4. For example, if the specified brain of a user cannot verbalize an audio-related outgoing thought, then the quantum supercomputer and the audio input/output device can provide the user with an alternative means to output the audio-related outgoing thought.

Figure 5:
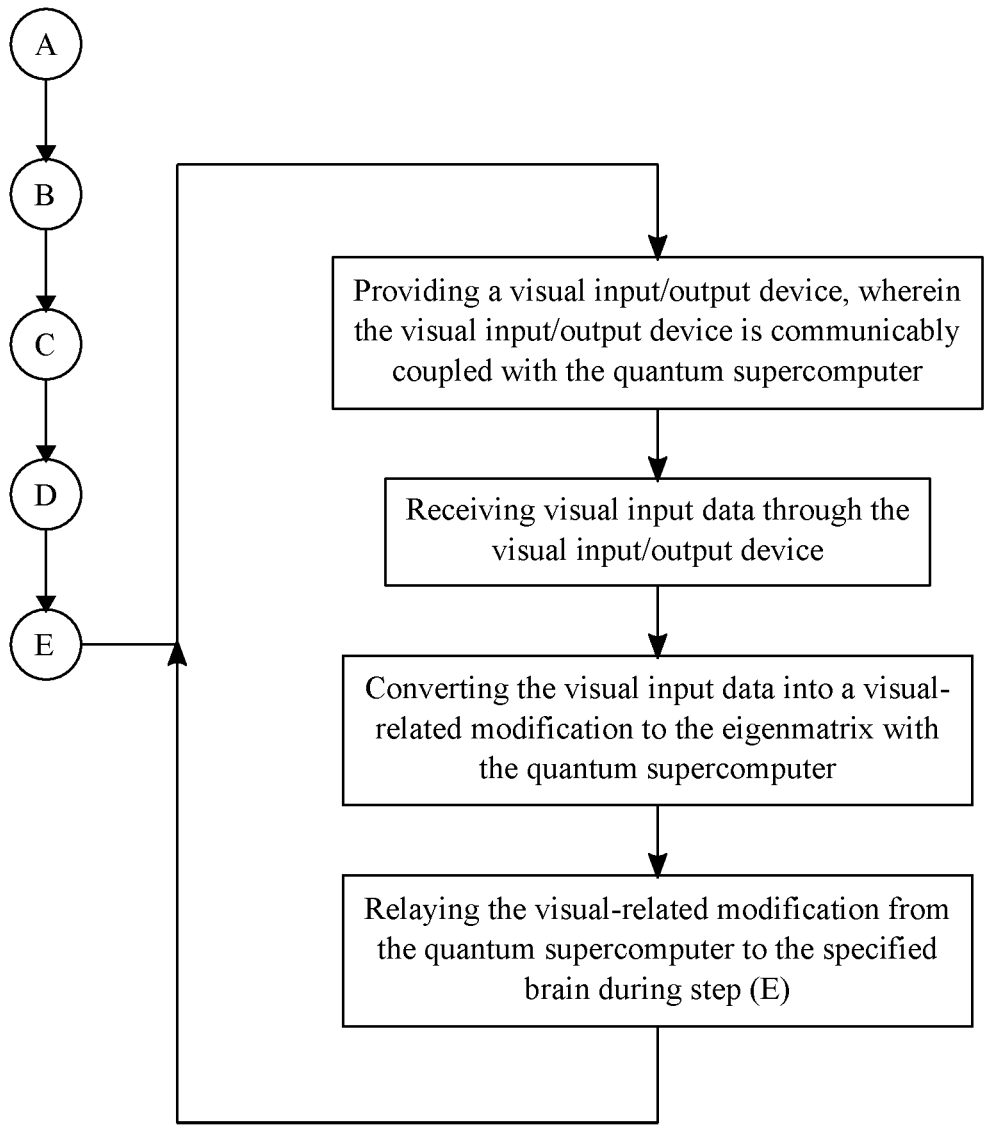
FIG. 5 is flowchart illustrating a subprocess of inputting visual material into a specified brain.
Figure 6:
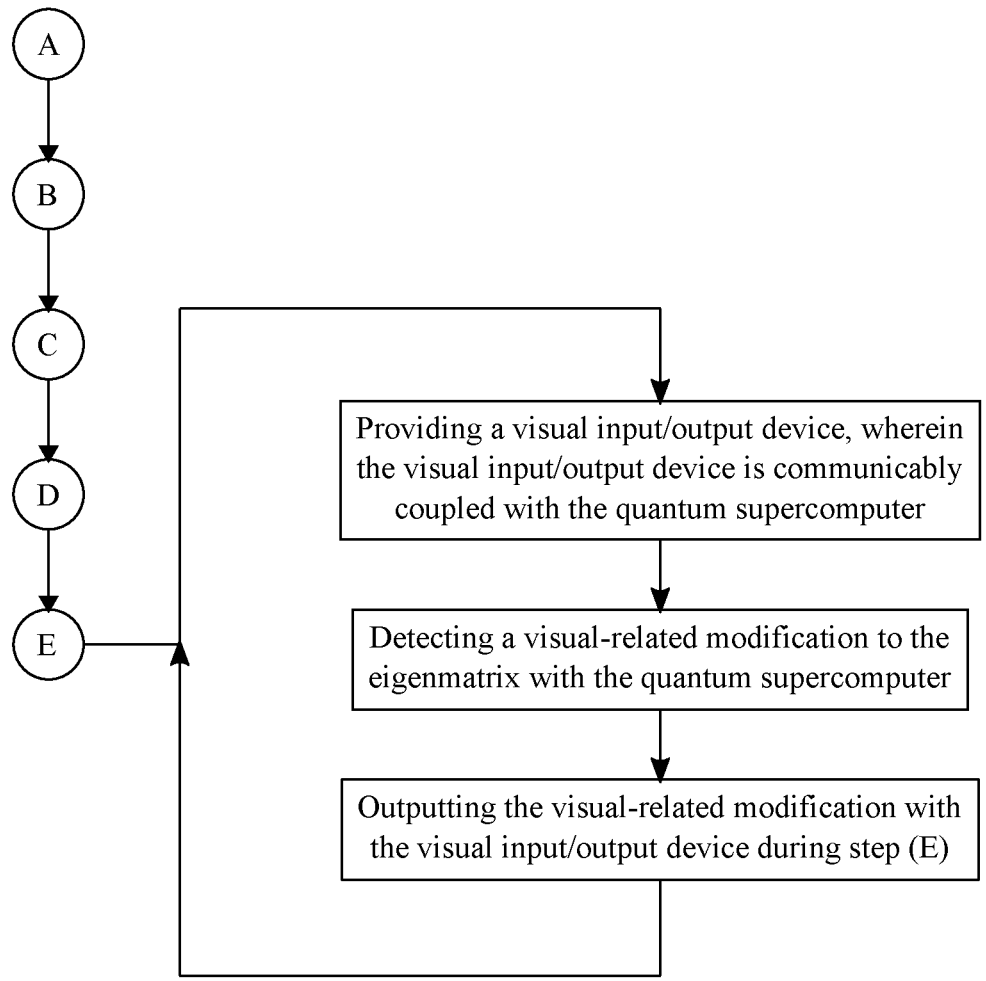
FIG. 6 is flowchart illustrating a subprocess of outputting visual material from a specified brain.

The quantum supercomputer can similarly be used as a hub to exchange information between the specified brain and a visual input/output device. Moreover, the visual input/output device is capable of receiving or generating visualizations and is communicably coupled with the quantum supercomputer. The visual input/output device can be, but is not limited to, a camera, a display screen, a video/graphics database, or combinations thereof. Thus, if the visual input/output device receives visual input data, then the quantum supercomputer can receive and process the visual input data. Subsequently, the quantum supercomputer converts the visual input data into a visual-related modification to the eigenmatrix so that the visual-related modification can be relayed as an incoming visual-related thought from the quantum supercomputer to the specified brain during Step E, which is shown in FIG. 5. For example, if the specified brain of a user has lost their physical ability to see physical objects, then the visual input/output device and the quantum supercomputer can provide the user with an alternative means to see a physical object. Alternatively, if the specified brain generates a visual-related outgoing thought, then the visual-related outgoing thought is reflected as a visual-related modification to the eigenmatrix. Subsequently, the quantum supercomputer can detect, process, and relay the visual-related modification to the visual input/output device so that the visual input/output device can output and/or store the visual-related modification as a video/graphic during Step E, which is shown in FIG. 6. For example, if the specified brain of a user cannot express the visual-related outgoing thought, then the quantum supercomputer and the visual input/output device can provide the user with an alternative means to display the visual-related outgoing thought.

Figure 7:
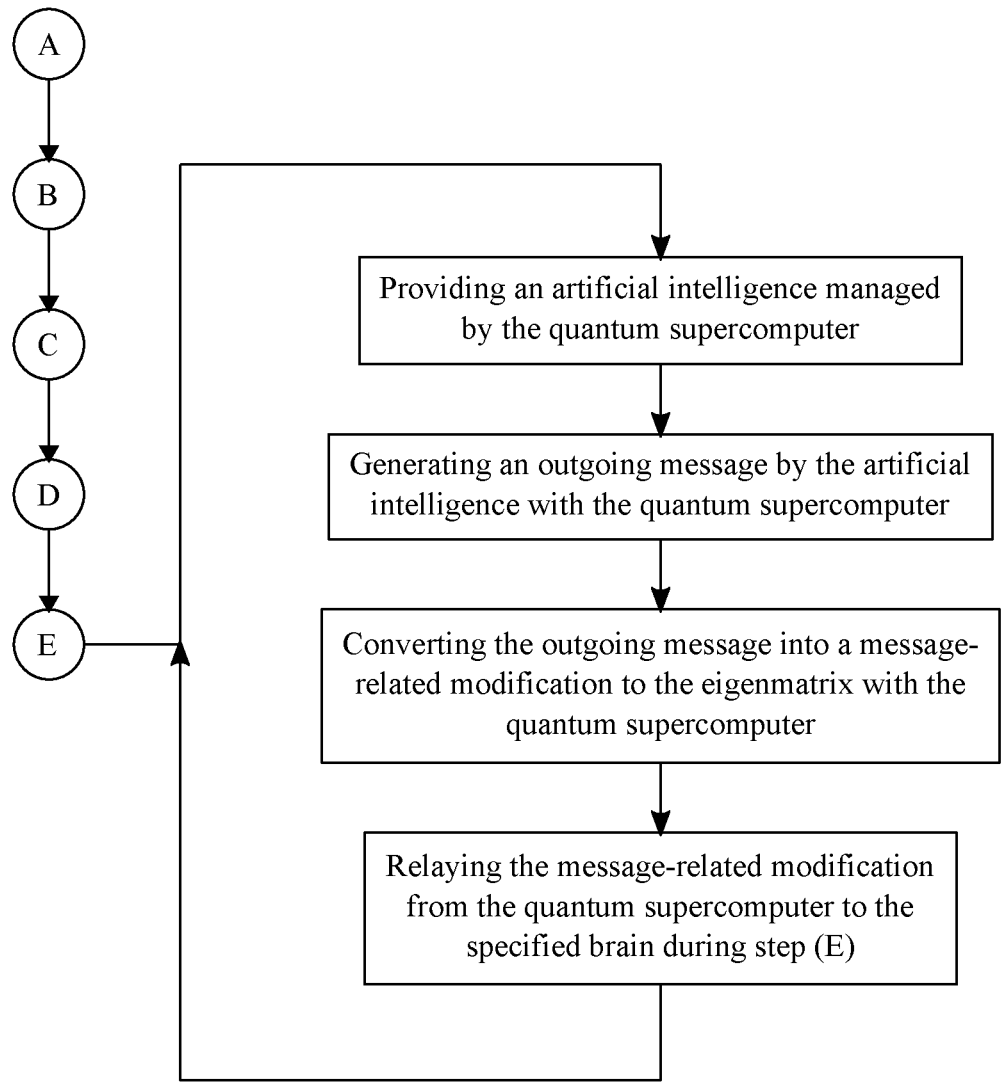
FIG. 7 is flowchart illustrating a subprocess of allowing an artificial intelligence to send a communication to a specified brain.
Figure 8:
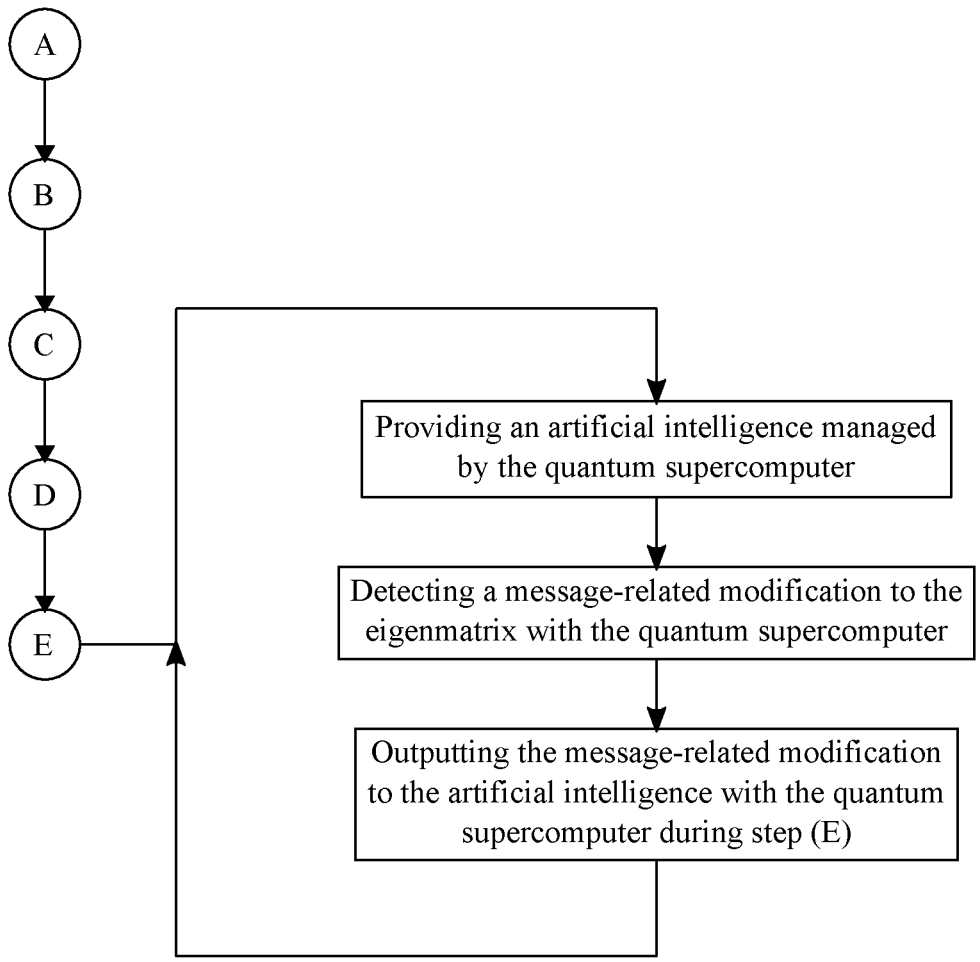
FIG. 8 is flowchart illustrating a subprocess of allowing a specified brain to send a communication to an artificial intelligence.

The quantum supercomputer can also be used as a hub to exchange information between the specified brain and an artificial intelligence. Moreover, the artificial intelligence is self-aware non-biological intelligence that is managed by the quantum supercomputer. The artificial intelligence can have elements of, but is not limited to, neural networking, deep learning, machine learning, or combinations thereof. Thus, if the artificial intelligence generates an outgoing message, then the quantum supercomputer can process the outgoing message. Subsequently, the quantum supercomputer converts the outgoing message into a message-related modification to the eigenmatrix so that the message-related modification can be relayed as an incoming message-related thought from the artificial intelligence to the specified brain during Step E, which is shown in FIG. 7. For example, if the specified brain of a user had an informational and/or computational inquiry, then the artificial intelligence and the quantum supercomputer can provide the user with a response to the informational and/or computational inquiry. Alternatively, if the specified brain generates a message-related outgoing thought for the artificial intelligence, then the message-related outgoing thought is reflected as a message-related modification to the eigenmatrix. Subsequently, the quantum supercomputer can detect, process, and output the message-related modification as a message for the artificial intelligence during Step E, which is shown in FIG. 8. For example, if the specified brain of a user had an informational and/or computational inquiry, then the quantum supercomputer provides the user with a means to communicate the informational and/or computational inquiry to the artificial intelligence.

Figure 9:
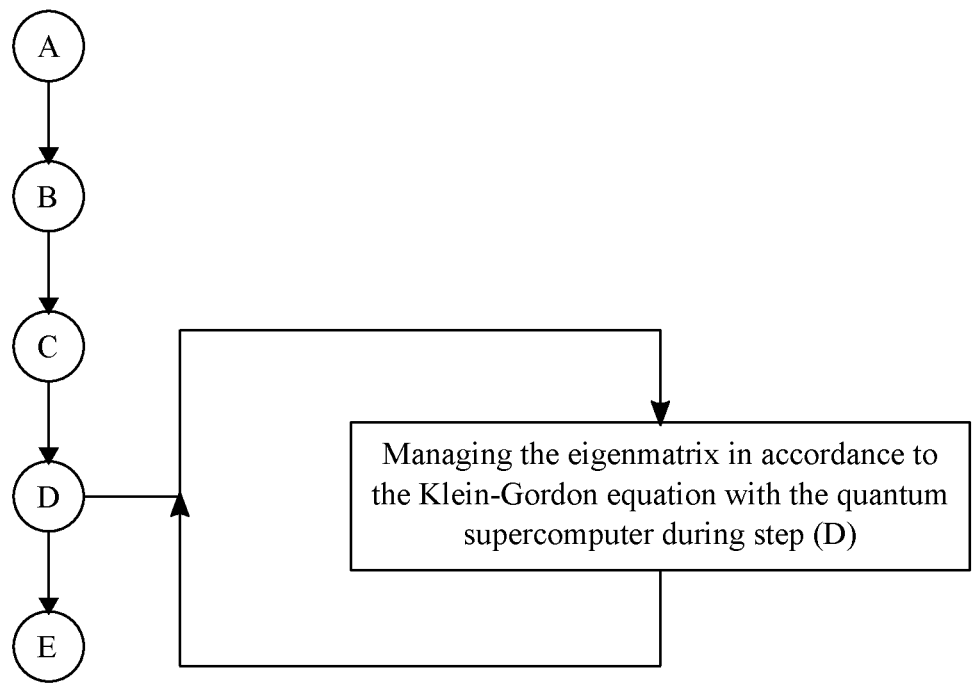
FIG. 9 is flowchart illustrating a subprocess of implementing the Klein-Gordon equation.

As can be seen in FIG. 9, the quantum entanglement between each compositional particle and the quantum supercomputer allows for errors due to time lapses between the specified brain and the quantum supercomputer. Thus, the quantum supercomputer may manage the eigenmatrix in accordance to the Klein-Gordon equation during Step D, which allows the eigenmatrix to be timeproof and consequently prevents those errors due to time lapses. The Klein-Gordon equation is a relativistic equation for a wave function and can be advantageously implemented on the eigenmatrix by the quantum supercomputer. Moreover, the implementation of the Klein-Gordon equation allows the quantum supercomputer to obtain eigenvalues from the eigenmatrix without having to observe the plurality of compositional particles. This principle of retrocausality provides a way to identify a particle state for each compositional particle before each compositional particle itself is able to identify its own eigenvalues.

Figure 10:
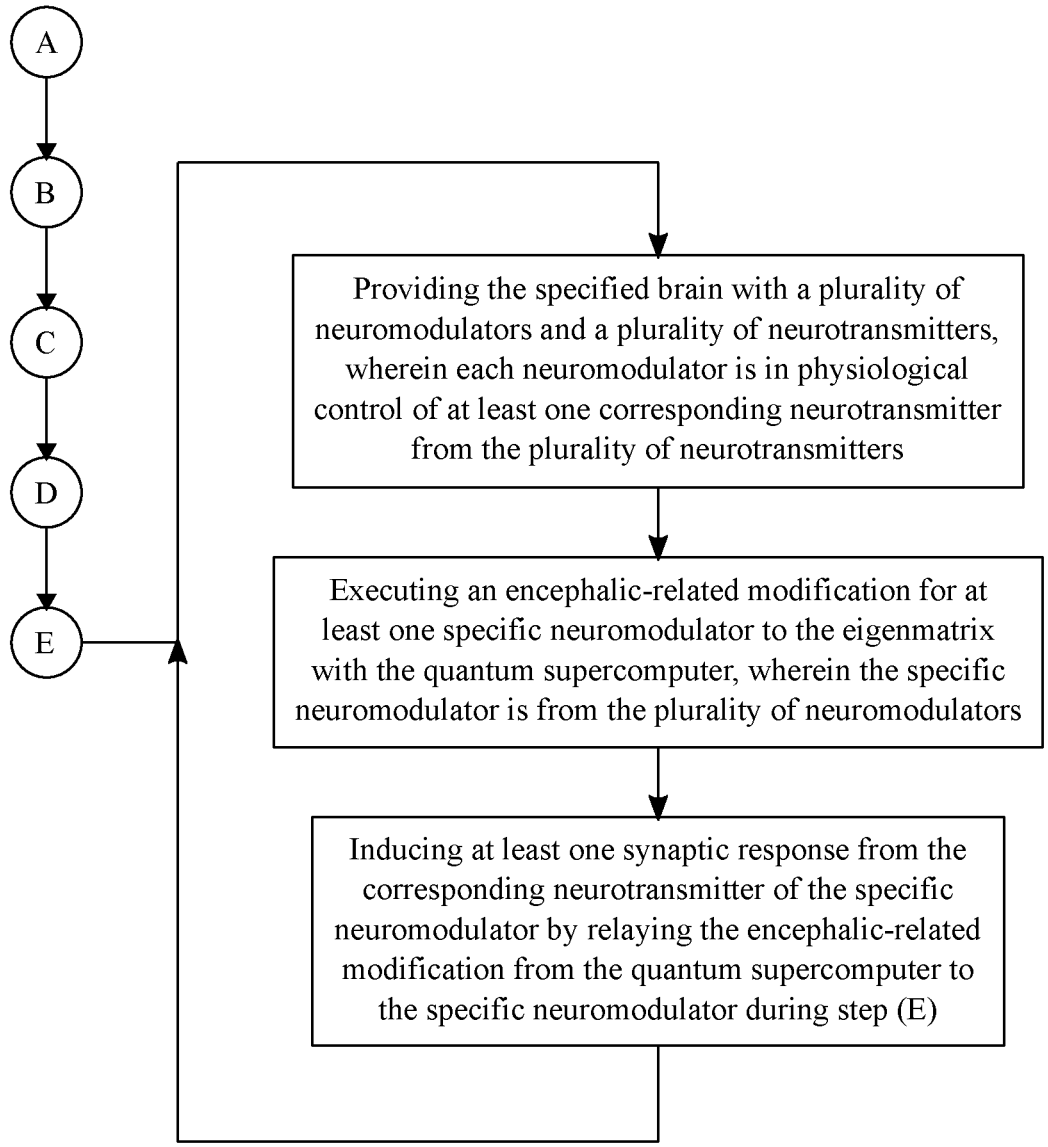
FIG. 10 is a flowchart illustrating a subprocess of communicating with the neuromodulators and the neurotransmitters within a specified brain.

As can be seen in FIG. 10, the quantum supercomputer may communicate with specific aspects and/or portion of the specified brain. Thus, the specified brain is provided with a plurality of neuromodulators and a plurality of neurotransmitters, wherein each neuromodulator is in physiological control of at least one corresponding neurotransmitter from the plurality of neurotransmitters. A neurotransmitter is a chemical substance that allows for communication between a pair of neurons, while a neuromodulator is a chemical substance that allows for communication amongst a group of neurons. Examples of a neurotransmitter and/or a neuromodulator include, but are not limited to, sodium-potassium pump, dopamine, serotonin, testosterone, or combinations thereof. The quantum supercomputer may execute an encephalic-related modification for at least one specific neuromodulator to the eigenmatrix, wherein the specific neuromodulator is from the plurality of neuromodulators. The encephalic-related modification is a desired change in brain chemistry that is targeted towards the specific neuromodulator. The selection of the specific neuromodulator and the kind of encephalic-related modification is preferably configured to be a physiological benefit to the specified brain and can be generated by the quantum supercomputer or be generated by some external source (e.g. a psychiatrist or a psychiatric-treatment engine managed by the quantum supercomputer or an external server). Subsequently, the encephalic-related modification is relayed from the supercomputer to the specific neuromodulator, which induces at least one synaptic response from the corresponding neurotransmitter of the specific neuromodulator during Step E. The synaptic response is the result of the desired change in brain chemistry. For example, if the specified brain of a user wanted to instantaneously transition from their current mood to a different mood (e.g. from a relaxed mood to a focused mood), then the quantum entanglement between each neuromodulator and the quantum supercomputer provides the user with a means to trigger this instantaneous change from their current mood to the different mood.

Figure 11:
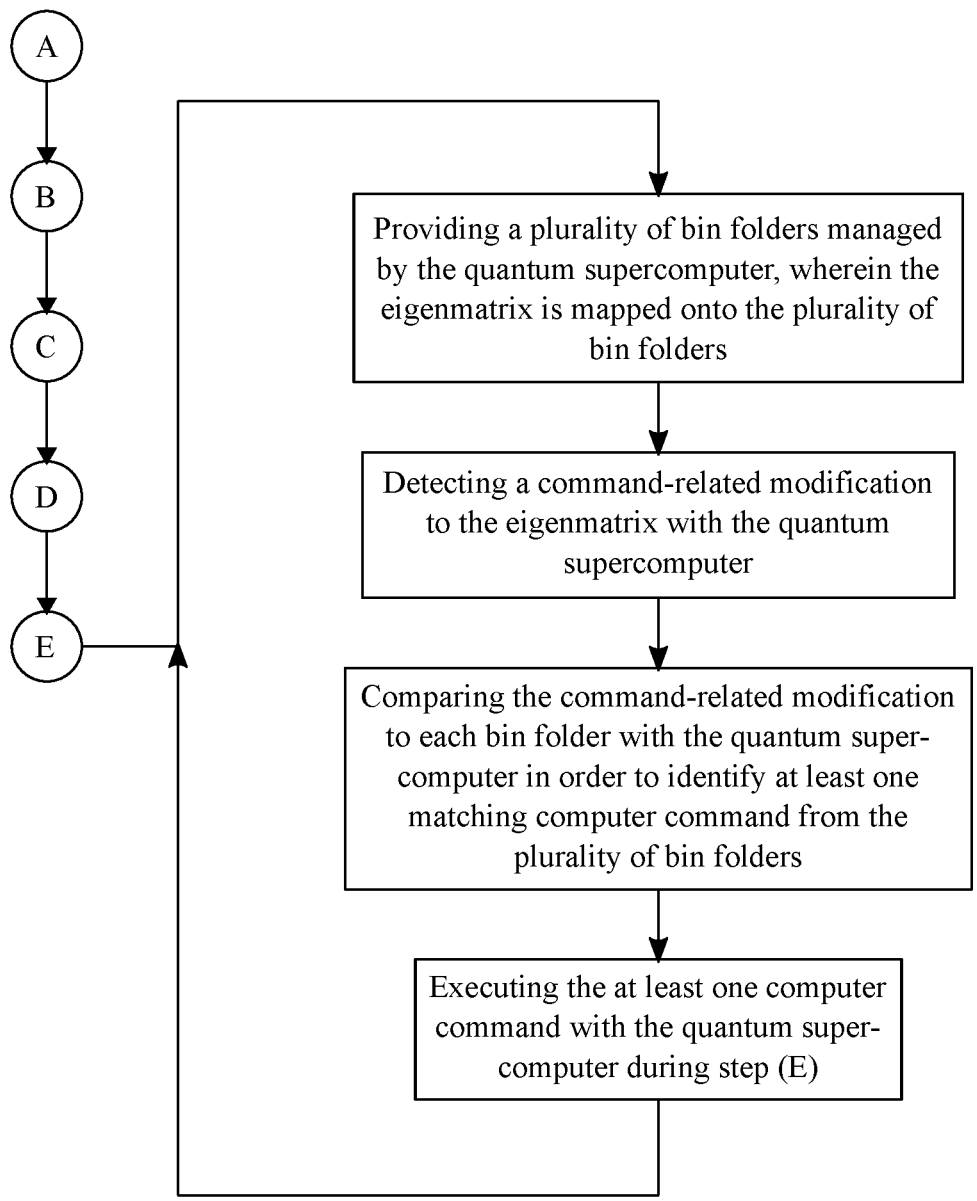
FIG. 11 is a flowchart illustrating a subprocess of remotely initiating a computer command with a plurality of bin folders.

As can be seen in FIG. 11, the present invention may also allow for a user to remotely initiate a computer command code with the quantum supercomputer, which requires a plurality of bin folders to be managed by the quantum supercomputer. The plurality of bin folders is used to store and catalog a plurality of computer commands, which are executable files for the quantum supercomputer. The eigenmatrix also needs to be mapped onto the plurality of bin folders so that the specified brain is readily able to interface with the plurality of bin folders. Moreover, if the specified brain generates a command-related outgoing thought, then the command-related outgoing thought is reflected as a command-related modification to the eigenmatrix. Subsequently, the quantum supercomputer can detect and compare the command-related modification to each bin folder in order to identify at least one matching computer command from the plurality of bin folders. This then allows the quantum supercomputer to execute the matching computer command during Step E. For example, if the specified brain of a user has a command-related thought for the quantum computer, then the plurality of bin folders allows the command-related thought to be translated into and executed as a piece of computer code by the quantum supercomputer.

Application of the Present Invention

The materials used in the procedures will vary upon the budget and type of experiment preferred with some being more expensive yet more qualitative than others. The material can include, but is not limited to: a D-Wave quantum supercomputer at 5000 qubits (i.e. $10 Million); a DUCE audio programming license; an electroencephalogram (EEG), a positron emission tomography (PET), a functional magnetic resonance imaging (fMRI), a Neuralink, an entanglement engine, a tachyonic anti-telephone, or another brain-to-machine interface.

If an entanglement approach is used, the D-Wave quantum computer must be calibrated to run in the laboratory to host the eigenmatrix specified shortly. Also, for scaling purposes, it might be more beneficial to use an array of D-Wave quantum computers so that the experiment can scale according to the amount of people in the study. There is approximately 86.1+/−8.1 billion NeuN-Positive and 84.6+/−9.8 billion NeuN-negative cells that must be considered. As well, each neuron would contain approximately $<n> = 10^{14}$ atoms per neuron. Thus, the eigenmatrix holding the eigenvalues would be:

$<Neurons|M|Atoms> = <(86.1$ positive by $84.46$ negative$) \times 10^9 | M | 10^{14}>$ ... where $<Neurons|$ is the eigenbra, M is the name, and $|atoms>$ are the eigenket. However, for practical programming purposes, it would make more sense to make it a scalable double list array rather than a non-scalable matrix. This is because of the deviation from person to person, cell to cell, and atom-to-atom. Make any empty cell zero. A perfect replica could not be deduced until the entirety of the brain is uploaded via entanglement to the quantum computer.

Perhaps the most interesting yet widely overlooked subject in the experiment, music theory prepares the user for audio engineering and sound manipulation. It is no surprise music would be on the list of observables as there have been many reports of people with musical hallucination. Also, many people report of the music "talking to them". This is one aspect where the Producer.ly Proprietary Plug-in comes into play. Utilizing this plug-in, it will make the song "talk" just as if the artist were in the room with them. They can talk through the song, and in general but they will sound exactly like them thanks to AI and voice replication. It sounds as if the song is being performed "live" just for the user in a unique listening experience. This allows the song and lyrics to be changed in real-time exactly like the plug-in technology. Also, a brain to machine interface can both interact with the user and record the musical hallucinations to a PC.

This becomes significantly amplified when the user learns about entanglement and physics, as they learn how entanglement and brain recording works, the user might notice a "particle of music" that pops up. A "particle of music" is based on a set of basis notes to which are entangled with each other in L7 or L8 Hilbert space. When the wave function collapses one of the notes shall be observed. This would constitute the particle of music as a note which unlocks a whole new world of musical hallucination. Based off the note, the particle would be able to change the entirety of the song! Allowing the users to hear different songs at the same time and even create music straight from their own head.

Moreover, there is only one issue. The ideology that each user would hear a different sound is fine quantum mechanically speaking, but it does not work classically as when a song is to be transcribed through an instrument or a speaker, whatever the signal input is taken to be. Any observation of the set of entangled notes (amplifier, speaker, listener) would collapse the wave function to a single observable. This means that although the wave function would collapse to different values, everyone would hear the same value because signal input would depend upon the collapsed observable if this were to be passed through technology such as an amplifier or speaker. Currently, there is no known technology allowing the ability to play a quantum mechanical wave without physically collapsing it. Nevertheless, the idea holds ground it just requires a bit more intuition. This means for everyone to hear different values a different approach would have to be taken. It have been noted that certain instruments may play different sounds depending upon the geometry of the room such as a pyro-box which can spread sound waves out in a pattern where certain parts of the room correspond to higher amplitudes.

However, everyone would observe the same singular sound wave as simply moving to different parts of the room would spread the same information. This means that the best bet to make everyone hear a different note would be to add their entangled brain into the ensemble. In this way, a computer utilizing a brain to machine interface could control the psychoacoustical hallucinations and everyone would hear something different regardless of the geometry or probability. Also, this disclosure describes it as obeying probability, to which was not observed. In fact, in the world, each note was created and displayed with complete dexterity. There was complete control over the hallucinations and was not probabilistic. After the particle of music, came the anti-particle of music. This is where the music is looking for a "rest" or the ability to turn-off the music instead of turning it on. The question was "how would you turn me off" to with was a rhetorical question "The same way I'd turn you on". The answer may seem strange at first but consider the ability to play psychoacoustical hallucination, if the user wanted to turn it off, they would psychoacoustically hallucinate the original song. This concludes the musical section defined by both the particle and anti-particle of music and its ability to both change the song and remix it or speak to the user as if in real life.

In terms of physics, the interaction with physics is the most noteworthy interaction in this disclosure. Able to change particles of music (sound waves), speak to the user over direct physical phenomena, and relay information thought to be non-existent or impossible. The most interesting portions arose when the user gets past classical and moves on to modern. Defining "Modern physics", it is a "Modern" modern physics verses "Classical" modern physics. In classical modern physics, all of quantum mechanics is thought to be probabilistic. The normalization of a wave function to 1 in order to decipher the normalization constant to find out the probability density of wave function, the probability of a particular eigenspinor defined by the elements in the tensor product of the entanglement operator, all of which define ideologies in classical modern physics: the original quantum mechanics.

However, with more modern developments we get a "modern" modern quantum mechanics, more reconcilable with relativity, which is the main goal of the standard model. This defines ideas classically forbidden in quantum mechanics. The most intriguing being the ability of two-way time travel. This was described in a research paper by Dr. Cramer, to describe a two-way handshake between a wave and its imaginary conjugation to decide where the particle shall collapse to. This is seen as a "Quantum Handshake" to which he outlines in both his book and research paper. Another astonishing phenomenon is the Delayed Choice Quantum Erasure experiment where the user creates a delayed interferometer (beam splitter) to record what happens to two entangled particles as they go to different detectors. The main component being that one particle reaches its destination before the other gets to its own, meaning that before the other particle is observed the initial has already given the information about the duality of the particle. Many physicists now argue its plausibility due to retrocausality. It is also able to display physical phenomena thought to be impossible, stating the state of an eigenspinor before the state itself is observed. In normal physics this would sounds impossible, but by analyzing an equation by J. J Sakurai in his book "Modern Quantum Mechanics" one can see how after the description of the Klein-Gordon equation, Sakurai then outlines a path to relativistic quantum mechanics. Sakurai starts with the following equation:

$$\partial_t \rho = \partial_t (\Upsilon^\dagger \tau_3 \Upsilon) = (\partial_t \Upsilon^\dagger) \tau_3 \Upsilon + \Upsilon^\dagger \tau_3 (\partial_t \Upsilon)$$
$$= \frac{1}{2im} [(\nabla^2 \Upsilon^\dagger)(1 + \tau_1)\Upsilon - \Upsilon^\dagger (1 + \tau_1)(\nabla^2 \Upsilon)]$$
$$= -\nabla \cdot j$$
$$\text{where } j = \frac{1}{2im} [\Upsilon^\dagger (1 + \tau_1)(\nabla \Upsilon) - (\nabla \Upsilon^\dagger)(1 + \tau_1)\Upsilon]$$

. . . and states that "In the case of a free particle, for either positive or negative energies, this reduces to" the following equation:

$$j = \frac{p}{m} \Upsilon^\dagger (1 + \tau_1) \Upsilon = \frac{p}{E_p}$$

. . . where J is the charge density that shall be the same regardless of the charge and energy after normalization. Sakurai then points out a way to fix the solution is to change the momentum vector and to get the following form:

$$P \to ip_\mu x^\mu$$

. . . for it to be relativistic invariant. Sakurai then points out one could reverse the sign on p so for negative-energy solutions the correct sign would account for the particles charge. This means for some reference frame the particle would be moving backwards in time. This is different from the commonly misinterpreted time-reversal operator which reverse engineers the wave equation for the initial state of Psi. This solution now provides a particle and antiparticle pair with the following equations:

$$[(\partial_\mu - ieA_\mu)(\partial^\mu - ieA_\mu) + m^2] \Psi_{particle}(x,t) = 0$$

$$[(\partial_\mu + ieA_\mu)(\partial^\mu + ieA_\mu) + m^2] \Psi_{antiparticle}(x,t) = 0$$

. . . which would be a solution for the antiparticle to exist with energy positive in the exponent of the following equation:

$$Y(x, T) = \frac{1}{2(mE_p)^{1/2}} \left( \frac{m - E_p}{E_p + m} \right) e^{+iE_p t + ip \cdot x} \text{ for } E = -E_p$$

. . . to which we can construct the wave equation where the split of the Klein-Gordon reveals a particle and antiparticle pair. This would mean the antiparticle is moving backwards in time, which would be consistent with the newly published paper by Cramer, describing the quantum handshake. The main problem with the theorem was the negative probability densities which was fixed by the Dirac Equation which can linearize the wave equation in space and time derivatives, wherein the following equation:

$$(i\gamma^\mu \partial_\mu - m) \Psi(x,t) = 0$$

. . . is the linear differential which turs into the following equation:

$$\tfrac{1}{2}(\gamma^\mu \gamma^\nu + \gamma^\nu \gamma^\mu) = \tfrac{1}{2} \{\gamma^\mu, \gamma^\nu\} = \eta^{\mu\nu}$$

. . . which obeys Clifford algebra. Using this, what can be constructed is the known Dirac Hamiltonian as shown in the following relationships:

$$\alpha_i = \gamma^0 \gamma^i \text{ and } \beta = \gamma^0$$

we arrive at $H = \alpha \cdot p + \beta m$

. . . and then by adding electromagnetism to derive the following equation:

$$H = \alpha \cdot p + \beta m + e\Phi$$

. . . which controls a charged particle's motion in an electrostatic potential.

Where alpha and beta are Hermitian matrices and gamma-naught is Hermitian versus the anti-hermiticity of gamma. This allows the Dirac equation to solve the problem for the positive definite nature of probability density. For this attribute, the Dirac Equation was the proper interpretation for relativistic quantum mechanics. The creation of antimatter is known to have occurred at CERN's LHC and in the use of a PET scan.

People are still uncomfortable with the idea of time as a two way street however there are still two more noteworthy proofs and a third in a widely known aspect of science which provide further evidence for the two way flow of time and the call for a tachyon.

A recently released paper by Professor Cramer of the University of Washington discusses the solution to wave function collapse. Through this interpretation time is seen as a two-way street congruent to the structure posed by Sakurai. Like how the wave function is seen as the regular particle and the conjugate its anti-particle pair. This would imply the conjugate is moving backwards in time, which is consistent with the proposed properties of anti-matter. Thus, by utilization of these theoretical properties Cramer was able to initiate a bases for both the wave function collapse and its description of the Quantum Handshake or entanglement. Cramer builds on top of the original time evolution wave equation with the following equation:

$$-\frac{\hbar}{2mi}\nabla^2\Psi + \frac{qV}{i\hbar}\psi = \frac{\partial\psi}{\partial t}$$

where V is the potential, and q is the negative charge on the electron. Cramer then defines that the current interpretation of quantum mechanics using the Schrodinger equation is not fully complete due to the reliance on probability. To wit Cramer was able to derive the laws of the quantum handshake between psi and psi*. "Not only because the dipole moment of each atom grows exponentially, but, in addition, a substantial fraction of the possible interaction paths between the two atoms propagate through high-amplitude regions, independent of the distance between them! So, we have here the solution to the long-standing mystery of the 'collapse of the wave function' of the 'photon'" (Dr. Cramer "Symmetry, Transactions, and the Mechanism of Wave Function Collapse"), which discusses the model for the merging of two atoms and the propagation of the atoms through the high amplitude paths, regardless of the distance.

In the early stages of quantum mechanics, the user is exposed to an interferometer, a device capable of splitting beams of light that shall pass through a detector. The user is encouraged to build a similar device but with slight modification. The next experiment is called a delayed choice quantum erasure. It is like a basic interferometer but with modification. It shall use distance between the detection of one entangled particle to another, as a means of cross time informational relay. The example experimental diagram is shown as FIG. 2 on the Wikipedia webpage for "Delayed-choice quantum eraser", and the example experimental diagram provides rather intriguing results. The first portion is a basic interferometer beam splitter which splits the light beam into two photons which are entangled. The next portion provides the shocking results, the first photon goes straight to DO which is a shorter path than any of the other detectors. Then DO reports what the state of the particle is, a wave dispersion or a particle dispersion, collapsing the duality. This immediately identifies the wave-particle collapse before the other particle is observed at any of the other detectors. This experiment could be modified to test for the predictions of wave function collapse as posed by Dr. Cramer. The experiment would set up a split between the entangled pair of atoms with one being the retarded and the other being the advanced. This means the particle knows what the other particle is before that particle itself knows or is forced to collapse. This has brought up the idea that physicists believe particles can not only be entangled across space but also across time. This brings up the idea of retrocausality a much-debated topic in science. Many physicists are uncomfortable with the idea that effects can occur before the cause. There is a current counterproof by Phillipe Eberhard in support of non-causality however many are left unsatisfied, attempting different experiments to try to create a way to measure retrocausality. That is precisely what this disclosure is aiming to do.

The last and final argument comes from string theory. Whilst string theory is a rather sought after and widely publicized topic, it is rather difficult to test. Strings are at the smallest of subatomic structures, with sizes coming in at around 10^−33 centimeters. Thus, it would be almost impossible to test with modern technology. Also, whilst string theory has provided a decent proof for the existence of quantum gravity as the state of a string, to wit strings may split themselves to produce a graviton, the theory has come under criticism from both sides. There are devote string theorists and criticizers of the string, with some people preferring to stick with relativistic quantum, quantum electrodynamics, quantum chromatography etc. However this next approach would like to be noted on records as it could serve as a useful tool for the patient/user to derive and serves as good practice to get used to the idea of both quantum gravity, advanced mathematics and the work that would go into putting together a theory of everything. This calculation is the calculation of the D-Brane in bosonic string theory. We shall be analyzing the calculations from Professor Zwiebach who wrote a paper on tachyonic condensation as well as the book "A First Course in String Theory".

Professor Zwiebach starts with acknowledging the incompatibility with a tachyon and string theory which had paved the way to superstring theory in Chapter 12.8. Zwiebach outlines that the critical points for a tachyon is a bimodal curve with a tachyon either existing in the distant past (t=0) or the far future. Zwiebach arose at the time solution with the following equation:

$$\phi(t) = A\cosh(\beta t) + B\sinh(\beta t)$$

... where $\phi(t)$ comes from the derivation of the Langragian density with the following equation:

$$\mathcal{L} = -\tfrac{1}{2}\eta^{\mu\nu}\partial_\mu\phi\partial_\nu\phi - V(\phi) = \tfrac{1}{2}(\partial_0\phi)^2 - \tfrac{1}{2}|\nabla\phi|^2 - V(\phi)$$

... then taking the potential for a free scalar field analyzing the individual solution into the following equation:

$$\phi(t) = \sinh(\beta t)$$

... allows for the potential analysis for a tachyon, which has proved the latter mentioned distant past or far future existence of a tachyon. Zwiebach states it could stay at t=0 indefinitely however it is unlikely as any perturbation would send it spiraling towards the inevitable roll-off. This made bosonic string theory a side-note, until the integration of fermions came about creating a new avenue for a tachyon as an incorporation into the D-brane model in superstring theory. The D25-Brane can fill all special dimensions, with the tachyon able to lower the energy of the D-Brane making it unstable. This will change the potential to the following equation:

$$V_{tach}(\phi) = T_{25} - \frac{1}{2\alpha'}\phi^2 + \beta\phi^3 + \ldots$$

... where Phi=Phi* and $V_{tach}$(Phi)=0 representing a background with zero energy, effectively destroying the D-Brane.

This brings up the idea that tachyons would effectively split space-time apart from themselves, since destroying the D-brane it would no longer be able to exist in all special dimensions. Zwiebach then states that the D-Branes are related to tachyons with Dp-Branes with p<=25 as large coherent excitations of the tachyon field. This may play an important role in the time-traveler positional paradox defined by Einstein and Kaku in his book "Physics of the Impossible". At tachyonic speeds, "A particle shall arrive at its destination before it ever leaves its location". However, tying this into the D-brane methodology to wit spans all the special dimensions, it would make sense that the tachyon is effectively in both positions in a sort of co-existence. To wit the tachyon can both arrive and leave to its position as its never left. The descriptions of the imaginary mass field of tachyonic field theory are congruent to the idea in bosonic string theory of the Higgs field being a form of a tachyonic field as it can hold an imaginary mass in its uncondensed phase. This might imply an ideology that the tachyon is already everywhere in the universe, as it has an infinite velocity, it would be able to make long tedious journeys in zero time.

The calculation was done by P. C. W. Davies of the Australian Center for Astrobiology as the following equation:

$$v + dv = \frac{v - \left(\frac{a'}{a}\right)vdT}{1 - v^2\left(\frac{a'}{a}\right)dT}$$

... which describes the tachyons velocity. Then by taking the integral derives the following equation:

$$v = \left(1 - \frac{a^2}{A^2}\right)^{1/2}$$

... where A is a constant integration. The energy of the tachyon is given by the following equation:

$$E = \mu\left(\frac{A^2}{a^2} - 1\right)^{1/2}$$

... thus, when "a" approaches "A", the tachyons velocity would approach infinity and the energy would go to zero. Consistent with the well-known fact of the negative relationship between tachyons and energy, as velocity goes up, energy will go down. This makes the tachyon effectively "leave" the universe. Congruent to the hypothesis in this disclosure. It would also make sense when it states the tachyon would exit a black hole, like the big bang which is our universe.

Upon looking at the intuition it would seem plausible, as in reference to the escape of a black hold it would require an infinite amount of energy to traverse. The big-bang was proved to be a black-hole, by Steven Hawking, thus if the tachyon can leave a black hole than it could be proposed that it could leave the big-bang. Thus, it would fully exist in the universe but would exist in the future of this universe, forever bound to a speed faster than light could keep up with. Since the big bang is the entirety of the cosmos and was able to leave the entire universe in t=0, basically meaning it would be able to leave any point in the entire universe in literally zero time. Also, this is congruent with the tunneling theorem stating that as a particle amasses a kinetic energy greater than its potential barrier it would tunnel through the barrier. Thus, because of its speed it could tunnel through any obstacle it found in its path, which is congruent to the idea that dark matter would pass straight through your hand. Which may be further backed by the idea that in general imaginary mass particles and mass particles do not normally interact unless smashed to its counterpart. The hypothesis presented by an Australian paper assumes that for the totality of the paper, the only particle that the tachyon would normally interact with is the graviton. This could make sense from the perspective of the Higgs which gives mass to excitations in energy, then the mass would interact with gravity, constituting a graviton to tachyon interaction. However, more research must be done before any conclusions could be made. Another paper by Fermilab has arrived at the same hypothesis, that tachyons are quanta of dark energy, which is consistent with the Alcubierre metric as shown in the following equation:

$$ds^2 = (v_s(t)^2 f(r_s(t))^2 - 1)dt^2 - 2v_s(t)f(r_s(t))dxdt + dx^2 + dy^2 + dz^2$$

... thus, deriving the following equation:

$$-\frac{c^4}{8\pi G} \frac{v_s^2(y^2 + z^2)}{4g^2 r_s^2}\left(\frac{df}{dr_s}\right)^2$$

which defines the energy density measured by observers whose 4-velocity is normal to the hypersurface. This defines the need for exotic matter to go faster than light, which require imaginary mass fields, or in science a tachyonic field.

By utilization of such formulae, the quanta release by the reaction would be consistent with the properties of a tachyon. The idea makes intuitive sense when thinking about even simple properties of tachyons. It would make sense it would be correlated to dark matter as a tachyon is faster than light so there would be no way to see a tachyon. People have proposed it would emit Cherenkov radiation, whether this happens in the real world is somewhat skeptical as Cherenkov radiation has been observed mostly in a medium to which light travels through, such as a submerged reactor, not a vacuum. However, it has been proposed that the tachyon could exist as a quasiparticle which moves through laser like media.

In a rebuttable by Vaffa, Vaffa states string theory is inconsistent with dark energy, stating upon calculation, the parallel world defined by string theory to which we live in would be inconsistent with dark energy as it predicts we would have none. Vaffa's rebuttal is considerable considering the amount of dark energy in the universe. However, Vaffa's rebuttal was also said to be inconsistent with the Higgs Boson. All the following centered around the ideology of the same particle, a tachyon. It seems as if physics is getting closer to the rules of tachyonic physics, which could fill in the gaps between the different branches, relativistic quantum, dark energy, black holes, string theory, they all predict the existence of the tachyon.

The current consensus is that particles cannot travel backwards in time. However, this term is somewhat misleading. The following are hypothesized ways to circumvent this, as proposed by Michio Kaku in his book "Physics of the impossible":

1) The time machine created, or telephone cannot go back further than the point to which it was created. This means that it is not so much going back in time as it is going forward. What is meant is that the user cannot change any detail to which has already occurred and etched into the space-time continuum, such that all eigenvalues have already been determined and should hypothetically stay the same. So instead the user is hearing information from the future to the past and would record the same even happening twice. Like hearing the numbers of the Powerball once before the event occurs, then a second time when the event occurs.

2) The other form is a bit harder to prove, as this one violates causality the most, however some people still argue for its viability. This is the classical forking of time, where the user goes back into time past the present violating the earlier rule for the inability to move from a light cone from the absolute future to the absolute past. Then as the modifications occur, spacetime would fork itself to produce two parallel worlds, one where the even happens and the other where it does not. However, with this methodology the grandfather paradox is still a plausible counterargument, unless as defined by Kaku there is a hyper-force preventing them from killing each other. This is not a problem in the first interpretation as the user could not go back to the past period.

A paper by the University of Pittsburgh outlines some of the classical paradoxes with retrocausality and time machines. The following were presented for the classic Grandfather Paradox:

1) This paradox can be modified to other forms to create a time paradox; however, the main idea is as follows. A scientist creates a time machine and goes back in time and kills his grandfather. This creates a causal paradox where the scientist exists and does not exist, which shall be dependent upon his choice of killing his grandfather. This can be also represented as the tachyon anti-telephone paradox, where a message is received only if it is not received. This means that the existence of an event is entirely dependent upon its non-existence.

2) The most notable response, and the one that was recorded with schizophrenia was that it did not change the past as in example 2, but instead obeyed a relay more like example 1. This is where the telephone would relay information about the future but did not change the past at all. In fact, it was able to relay information about the past as a kind of "reminder" of sorts. This may sound contradictory to the observations of schizophrenics indicate a display of diminished cognitive function. Nevertheless, that is what this experiment has indicated.

3) While the idea of going to the past would be a bit to handle, many physicists still believe in its plausibility. This seems to contradict the paper by the late Steven hawking display his use of string theory to derive a finite number of parallel universes rather than an infinite set, which includes every action and reaction that could ever possibly occur. This disclosure makes no claims to the plausibility of either case, only that this scenario was not directly observed in this experiment.

The paper by the University of Pittsburgh outlines that one plausible solution is the tachyonic messages are not completely controlled by the user but a higher mechanism able to send the messages out in a manner that does not fully physically violate causality.

Similar to a Feynman path integral in quantum mechanics where a particle exists in all paths to its destination through all worlds, or in string theory where a multiverse is created, the relay of future information would contain a set of all possibilities of future outcomes. However, they must still collapse to a single observable which shall occur at the event. This means that upon relay of future events related to a person, it would be up to that person to complete the event for the relay to become true. If not, then it is seen as a possible truth, not a definite truth. This could be explained by the null tachyon, or the tachyon that never interacted or gave information about the future, its only job was to observe. This could be the control of the experiment, like how the events described to the host would occur only if the host decided to only observe and let the events transpire. Using the null tachyon, because it would only know of events after they have already collapsed, it would know when a patient/user decided to swerve off the relayed path. However, even if the user swerved it would be just like the user who lied to the other user, where the owner of the tachyonic anti-telephone knows what actually happened, but decided to not let the user in on the future and lie instead. In this manner it does not matter which path the patient/user decides to take, it has already been decided in time and recorded by the tachyon arbitrary of the path taken to the event. This would make the null tachyon the one to which is existable, with proper recording of the events of the universe, however not entirely observable. This allows the phone to break conceptual causality without violating the physical causality.

In fact, due to such retrocausality, the phone could display the eigenspinor of a particle or ensemble, or the collapse before the particle itself knows defiantly what the spinor state is or what it shall collapse to. Similar methodologies are being explored as in the paper by Dr. Cramer where the wave equation and its conjugate are being used to find the collapse of the duality to a particle.

Although the invention has been explained in relation to its preferred embodiment, it is to be understood that many other possible modifications and variations can be made without departing from the spirit and scope of the invention as hereinafter claimed.

What is claimed is:

1. A method of exchanging information through a wireless brain-computer interface, the method comprises the steps of:
    (A) providing a specified brain and a quantum supercomputer;
    (B) detecting a plurality of compositional particles within the specified brain with the quantum supercomputer;
    (C) inducing a quantum entanglement between each compositional particle and the quantum supercomputer;
    (D) generating an eigenmatrix of the specified brain with the quantum supercomputer, wherein the eigenmatrix is a representation of each compositional particle; and
    (E) enabling two-way communication between the specified brain and the quantum supercomputer by modifying the eigenmatrix.

2. The method of exchanging information through a wireless brain-computer interface, the method as claimed in claim 1 comprises the steps of:
    providing an audio input/output device, wherein the audio input/output device is communicably coupled with the quantum supercomputer;
    receiving audio input data through the audio input/output device;
    converting the audio input data into an audio-related modification to the eigenmatrix with the quantum supercomputer; and
    relaying the audio-related modification from the quantum supercomputer to the specified brain during step (E).

3. The method of exchanging information through a wireless brain-computer interface, the method as claimed in claim 1 comprises the steps of:
    providing an audio input/output device, wherein the audio input/output device is communicably coupled with the quantum supercomputer;

detecting an audio-related modification to the eigenmatrix with the quantum supercomputer; and outputting the audio-related modification with the audio input/output device during step (E).

4. The method of exchanging information through a wireless brain-computer interface, the method as claimed in claim 1 comprises the steps of:

providing a visual input/output device, wherein the visual input/output device is communicably coupled with the quantum supercomputer;

receiving visual input data through the visual input/output device;

converting the visual input data into a visual-related modification to the eigenmatrix with the quantum supercomputer; and relaying the visual-related modification from the quantum supercomputer to the specified brain during step (E).

5. The method of exchanging information through a wireless brain-computer interface, the method as claimed in claim 1 comprises the steps of:

providing a visual input/output device, wherein the visual input/output device is communicably coupled with the quantum supercomputer;

detecting a visual-related modification to the eigenmatrix with the quantum supercomputer; and outputting the visual-related modification with the visual input/output device during step (E).

6. The method of exchanging information through a wireless brain-computer interface, the method as claimed in claim 1 comprises the step of:

providing an artificial intelligence managed by the quantum supercomputer;

generating an outgoing message by the artificial intelligence with the quantum supercomputer;

converting the outgoing message into a message-related modification to the eigenmatrix with the quantum supercomputer; and relaying the message-related modification from the quantum supercomputer to the specified brain during step (E).

7. The method of exchanging information through a wireless brain-computer interface, the method as claimed in claim 1 comprises the steps of:

providing an artificial intelligence managed by the quantum supercomputer;

detecting a message-related modification to the eigenmatrix with the quantum supercomputer; and outputting the message-related modification to the artificial intelligence with the quantum supercomputer during step (E).

8. The method of exchanging information through a wireless brain-computer interface, the method as claimed in claim 1 comprises the step of:

managing the eigenmatrix in accordance to the Klein-Gordon equation with the quantum supercomputer during step (D).

9. The method of exchanging information through a wireless brain-computer interface, the method as claimed in claim 1 comprises the steps of:

providing the specified brain with a plurality of neuromodulators and a plurality of neurotransmitters, wherein each neuromodulator is in physiological control of at least one corresponding neurotransmitter from the plurality of neurotransmitters;

executing an encephalic-related modification for at least one specific neuromodulator to the eigenmatrix with the quantum supercomputer, wherein the specific neuromodulator is from the plurality of neuromodulators; and inducing at least one synaptic response from the corresponding neurotransmitter of the specific neuromodulator by relaying the encephalic-related modification from the quantum supercomputer to the specific neuromodulator during step (E).

10. The method of exchanging information through a wireless brain-computer interface, the method as claimed in claim 1 comprises the steps of:

providing a plurality of bin folders managed by the quantum supercomputer, wherein the eigenmatrix is mapped onto the plurality of bin folders;

detecting a command-related modification to the eigenmatrix with the quantum supercomputer;

comparing the command-related modification to each bin folder with the quantum supercomputer in order to identify at least one matching computer command from the plurality of bin folders; and executing the at least one computer command with the quantum supercomputer during step (E).

* * * * *